US011866300B2

(12) United States Patent
Eastman et al.

(10) Patent No.: US 11,866,300 B2
(45) Date of Patent: Jan. 9, 2024

(54) OVERBRAIDED NON-METALLIC TENSION MEMBERS

(71) Applicant: Otis Elevator Company, Farmington, CT (US)

(72) Inventors: Scott Alan Eastman, Glastonbury, CT (US); Daniel A. Mosher, Glastonbury, CT (US); Wenping Zhao, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 129 days.

(21) Appl. No.: 15/829,425

(22) Filed: Dec. 1, 2017

(65) Prior Publication Data

US 2018/0155870 A1 Jun. 7, 2018

Related U.S. Application Data

(60) Provisional application No. 62/429,130, filed on Dec. 2, 2016.

(51) Int. Cl.
*B66B 7/06* (2006.01)
*D07B 1/16* (2006.01)
(Continued)

(52) U.S. Cl.
CPC .............. *B66B 7/062* (2013.01); *B66B 7/068* (2013.01); *D07B 1/068* (2013.01); *D07B 1/162* (2013.01);
(Continued)

(58) Field of Classification Search
USPC ........................................................... 57/223
See application file for complete search history.

(56) References Cited

U.S. PATENT DOCUMENTS 2,382,355 A * 8/1945 Warren, Jr. .............. H01B 7/28 252/301.36
4,197,695 A * 4/1980 Hughes .................. D07B 7/145 156/48
(Continued)

FOREIGN PATENT DOCUMENTS

CN 204370224 U 6/2015
CN 204780427 U 11/2015
(Continued)

OTHER PUBLICATIONS

European Search Report Issued in EP Application No. 17204916.5, dated May 4, 2018, 9 Pages.
(Continued)

*Primary Examiner* — Patrick J. Lynch
(74) *Attorney, Agent, or Firm* — CANTOR COLBURN LLP

(57) ABSTRACT

A tension member for a lifting and/or hoisting system includes a core including a plurality of load carrying fibers arranged in a matrix material, and an outer layer secured to the core including a plurality of outer fibers arranged around a perimeter of the core. The outer layer includes one or more outer fibers arranged off-axis relative to the load carrying fibers of the core. A method of forming a tension member for an elevator system includes arranging a plurality of load carrying fibers along a length of the tension member, retaining the plurality of load carrying fibers in a matrix material to define a core, and enclosing the core in an outer layer including a plurality of outer fibers arranged around a perimeter of the core. The outer layer includes one or more outer fibers arranged off-axis relative to the load carrying fibers of the core.

3 Claims, 5 Drawing Sheets

(51) Int. Cl.
*D07B 1/06* (2006.01)
*D07B 1/22* (2006.01)

(52) U.S. Cl.
CPC ........ *D07B 1/22* (2013.01); *D07B 2201/2085* (2013.01); *D07B 2201/2087* (2013.01); *D07B 2501/2007* (2013.01)

(56) References Cited

U.S. PATENT DOCUMENTS

| | | | | |
|---|---|---|---|---|
| 4,677,818 | A * | 7/1987 | Honda | D07B 1/025 57/224 |
| 5,727,357 | A * | 3/1998 | Arumugasaamy | D07B 1/025 428/377 |
| 6,314,711 | B1 * | 11/2001 | De Angelis | B66B 7/06 57/210 |
| 6,318,504 | B1 | 11/2001 | De Angelis | |
| 7,191,585 | B2 | 3/2007 | Vanderbeken et al. | |
| 7,828,121 | B2 | 11/2010 | Parrini | |
| 7,862,891 | B2 | 1/2011 | Hanna et al. | |
| 9,126,805 | B2 | 9/2015 | Pelto-Huikko et al. | |
| 2011/0000746 | A1 | 1/2011 | Pelto-Huikko et al. | |
| 2011/0192132 | A1 * | 8/2011 | Kimura | D07B 1/02 57/258 |
| 2011/0259677 | A1 | 10/2011 | Dudde et al. | |
| 2012/0070122 | A1 * | 3/2012 | Lind | D07B 1/147 385/103 |
| 2012/0297746 | A1 * | 11/2012 | Chou | D07B 1/02 57/230 |
| 2013/0048432 | A1 | 2/2013 | Alasentie | |
| 2013/0205742 | A1 * | 8/2013 | Smeets | D07B 1/0686 57/232 |
| 2013/0206516 | A1 * | 8/2013 | Pelto-Huikko | B66B 7/1238 187/254 |
| 2014/0305744 | A1 | 10/2014 | Kere et al. | |
| 2014/0305745 | A1 * | 10/2014 | Alasentie | D07B 1/165 187/266 |
| 2014/0345978 | A1 | 11/2014 | Alasentie et al. | |
| 2015/0113936 | A1 * | 4/2015 | Amils | D07B 3/00 57/216 |
| 2015/0128792 | A1 * | 5/2015 | Zachariades | D07B 1/04 87/9 |
| 2015/0247285 | A1 * | 9/2015 | Amils | D07B 1/16 57/221 |
| 2015/0307321 | A1 * | 10/2015 | Breite | D07B 1/02 187/254 |
| 2016/0207739 | A1 | 7/2016 | Pelto-Huikko | |

FOREIGN PATENT DOCUMENTS

| | | | |
|---|---|---|---|
| CN | 106192494 | A | 12/2016 |
| EP | 0995832 | A2 | 4/2000 |
| EP | 1312574 | B1 | 3/2012 |
| EP | 2683544 | A1 | 1/2014 |
| EP | 2821357 | A1 | 1/2015 |
| EP | 2860141 | A1 | 4/2015 |
| KR | 101564194 | B1 | 10/2015 |
| WO | 2012120064 | A1 | 9/2012 |
| WO | 2012120144 | A2 | 9/2012 |
| WO | 2015134023 | A1 | 9/2015 |
| WO | 2015134025 | A1 | 9/2015 |

OTHER PUBLICATIONS

Office Action for Australian Application No. 2017268631 dated Sep. 16, 2022.

* cited by examiner

OVERBRAIDED NON-METALLIC TENSION MEMBERS

CROSS-REFERENCE TO RELATED APPLICATIONS

This application claims the benefit of 62/429,130, filed Dec. 2, 2016, which is incorporated herein by reference in its entirety.

BACKGROUND

Embodiments disclosed herein relate to elevator systems, and more particularly, to a tension member configured for use in an elevator system.

Elevator systems are useful for carrying passengers, cargo, or both, between various levels in a building. Some elevators are traction based and utilize load bearing members such as ropes or belts for supporting the elevator car and achieving the desired movement and positioning of the elevator car.

As buildings reach new heights in their construction, with some architectural designs over 1 kilometer, more advanced hoisting methods are necessary for efficient transport of people and materials throughout the building. One limitation of conventional hoisting is the weight of conventional steel cable as it is only capable of rises of ~700 m. To address this, tension members have been developed using carbon fiber tension elements as these have a substantially higher specific strength and will allow hoisting solutions that can accommodate the proposed architectural designs of over 1 kilometer and there is an advantage of using lightweight tension members in buildings of even rises down to ~300 m.

Where ropes are used as load bearing members, each individual rope is not only a traction device for transmitting the pulling forces but also participates directly in the transmission of the traction forces. Where belts are used as a load bearing member, a plurality of tension elements are embedded in an elastomer belt body. The tension elements are exclusively responsible for transmitting the pulling forces, while the elastomer material transmits the traction forces. Due to their light weight and high strength, tension members formed from unidirectional fibers arranged in a rigid matrix composite provide significant benefits when used in elevator systems, particularly high rise systems. The fibers are impregnated with thermosetting resins and then cured to form rigid composites that are surrounded with the elastomer to provide traction for the belt.

BRIEF DESCRIPTION

In one embodiment, a tension member for a lifting and/or hoisting system includes a core including a plurality of load carrying fibers arranged in a matrix material, and an outer layer secured to the core including a plurality of outer fibers arranged around a perimeter of the core. The outer layer includes one or more outer fibers arranged off-axis relative to the load carrying fibers of the core.

Additionally or alternatively, in this or other embodiments the outer layer includes a plurality of outer fibers braided to form the outer layer.

Additionally or alternatively, in this or other embodiments the plurality of load carrying fibers include one or more of carbon, glass, aramid, nylon, and polymer fibers.

Additionally or alternatively, in this or other embodiments the matrix material is one or more of polyurethane, vinylester or epoxy.

Additionally or alternatively, in this or other embodiments the plurality of outer fibers are formed from the same material as the plurality of load carrying fibers.

Additionally or alternatively, in this or other embodiments the core is formed by a pultrusion process.

Additionally or alternatively, in this or other embodiments the plurality of load carrying fibers extend along an axial length of the tension member.

In another embodiment, a belt for suspending and/or driving an elevator car includes a plurality of tension members extending along a length of the belt, each tension member including a core including a plurality of load carrying fibers arranged in a matrix material and an outer layer secured to the core including a plurality of outer fibers arranged around a perimeter of the core. The outer layer includes one or more outer fibers arranged off-axis relative to the load carrying fibers of the core. A jacket at least partially encapsulates the plurality of tension members to retain the plurality of tension members.

Additionally or alternatively, in this or other embodiments the plurality of tension members are arranged along a lateral width of the belt.

Additionally or alternatively, in this or other embodiments the outer layer includes a plurality of outer fibers braided to form the outer layer.

Additionally or alternatively, in this or other embodiments the plurality of load carrying fibers include one or more of carbon, glass, aramid, nylon, and polymer fibers.

Additionally or alternatively, in this or other embodiments the plurality of outer fibers are formed from the same material as the plurality of load carrying fibers.

In yet another embodiment, a method of forming a tension member for an elevator system includes arranging a plurality of load carrying fibers along a length of the tension member, retaining the plurality of load carrying fibers in a matrix material to define a core, and enclosing the core in an outer layer including a plurality of outer fibers arranged around a perimeter of the core. The outer layer includes one or more outer fibers arranged off-axis relative to the load carrying fibers of the core.

Additionally or alternatively, in this or other embodiments enclosing the core in an outer layer includes braiding the plurality of outer fibers around the core.

Additionally or alternatively, in this or other embodiments the outer layer is impregnated with an outer matrix material.

Additionally or alternatively, in this or other embodiments the tension member is formed via a continuous manufacturing process.

Additionally or alternatively, in this or other embodiments the tension member is cut to a selected length.

Additionally or alternatively, in this or other embodiments the plurality of outer fibers are formed from the same material as the plurality of load carrying fibers.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains disclosed embodiments, together with advantages and features, by way of example with reference to the drawings.

DETAILED DESCRIPTION

Figure 1:
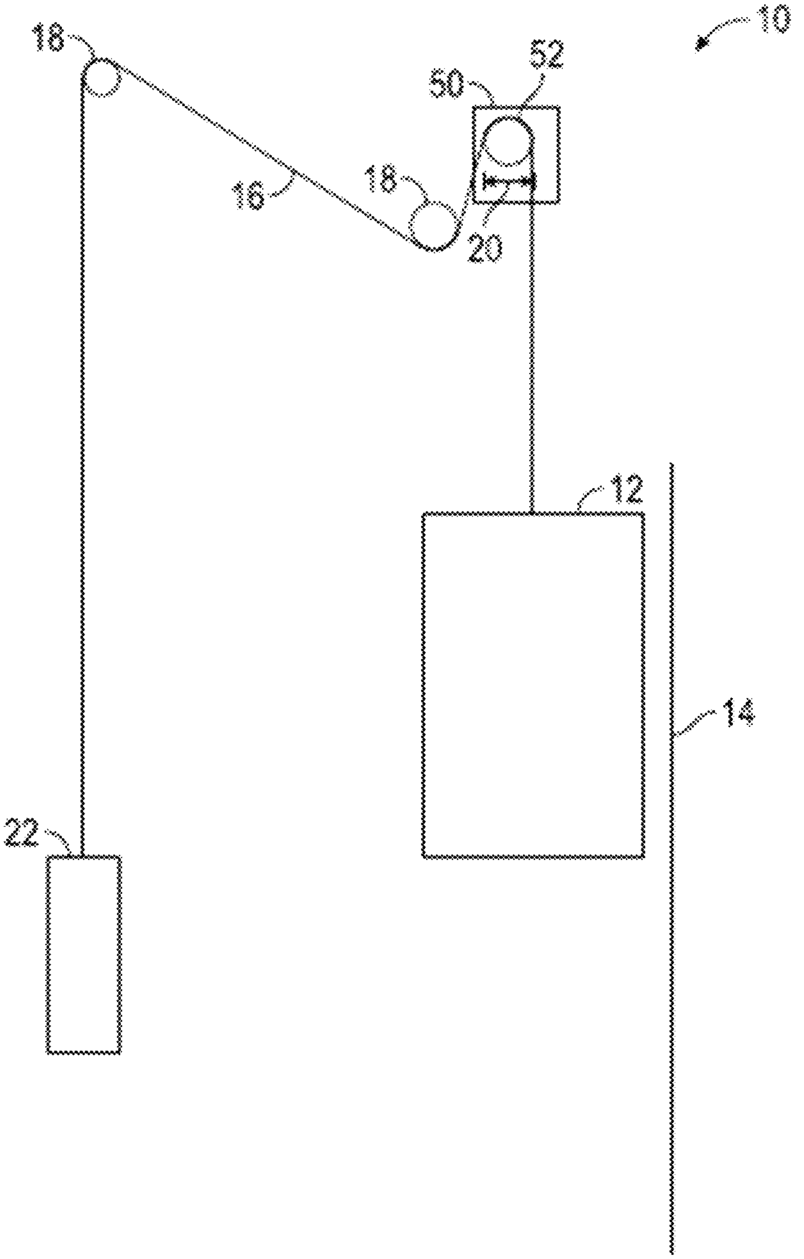
FIG. 1 is a perspective view of an example of a traction elevator system.

Shown in FIG. 1, is a schematic view of an exemplary traction elevator system 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more tension members 16. The one or more tension members 16 interact with one or more sheaves 18 to be routed around various components of the elevator system 10. The one or more tension members 16 could also be connected to a counterweight 22, which is used to help balance the elevator system 10 and reduce the difference in belt tension on both sides of the traction sheave during operation.

The sheaves 18 each have a diameter 20, which may be the same or different than the diameters of the other sheaves 18 in the elevator system 10. At least one of the sheaves could be a traction sheave 52. The traction sheave 52 is driven by a machine 50. Movement of drive sheave by the machine 50 drives, moves and/or propels (through traction) the one or more tension members 16 that are routed around the traction sheave 52. At least one of the sheaves 18 could be a diverter, deflector or idler sheave. Diverter, deflector or idler sheaves are not driven by a machine 50, but help guide the one or more tension members 16 around the various components of the elevator system 10.

In some embodiments, the elevator system 10 could use two or more tension members 16 for suspending and/or driving the elevator car 12. In addition, the elevator system 10 could have various configurations such that either both sides of the one or more tension members 16 engage the one or more sheaves 18 or only one side of the one or more tension members 16 engages the one or more sheaves 18. The embodiment of FIG. 1 shows a 1:1 roping arrangement in which the one or more tension members 16 terminate at the car 12 and counterweight 22, while other embodiments may utilize other roping arrangements.

Figure 2:
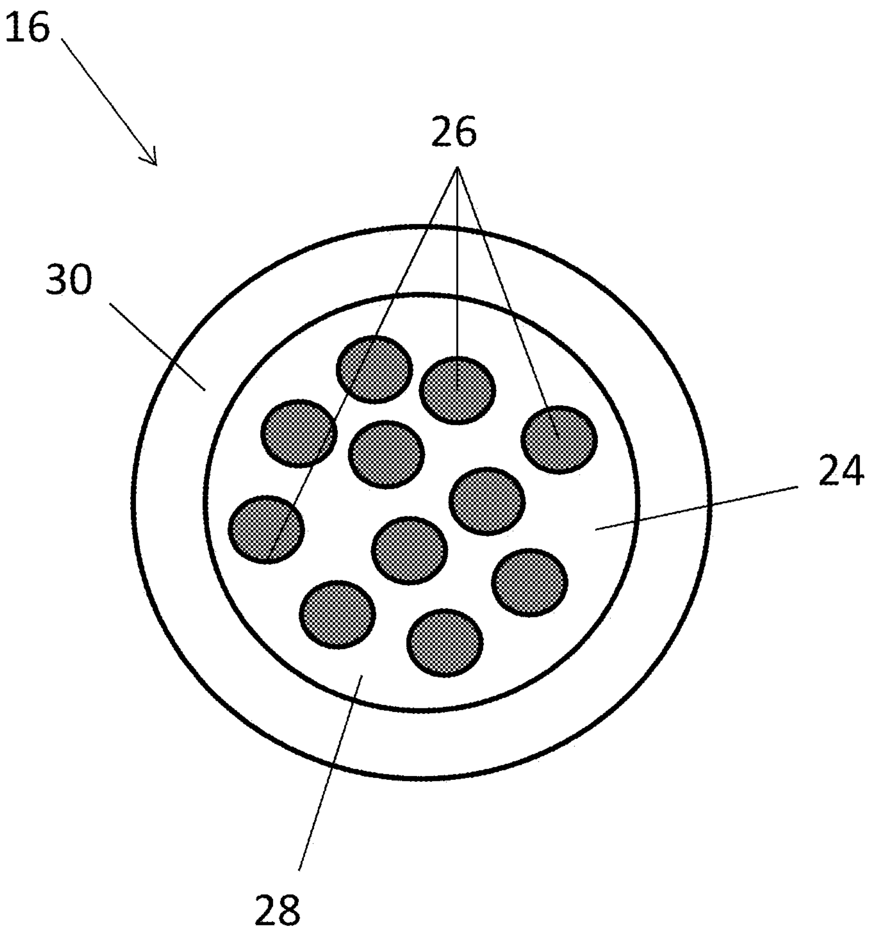
FIG. 2 is a cross-sectional view of an exemplary embodiment of a tension member for an elevator system.

Referring now to FIG. 2, a cross-sectional view of an embodiment of a tension member 16 is shown. The tension member 16 includes a core 24 formed from a plurality of individual load carrying fibers 26 arranged unidirectionally, substantially in a direction parallel to a tension member 16 length, within a matrix material 28.

Exemplary load carrying fibers 26 used to form the core 24 include, but are not limited to, carbon, glass, aramid, nylon, and polymer fibers, for example. Each of the load carrying fibers 26 within the core 24 may be substantially identical or may vary. In addition, the matrix material 28 may be formed from any suitable material, such as polyurethane, vinylester, and epoxy for example. The materials of the load carrying fibers 26 and the matrix material 28 are selected to achieve a desired stiffness and strength of the tension member 16.

The core 24 may be formed as thin layers, in some embodiments by a pultrusion process. In a standard pultrusion process, the load carrying fibers 26 are impregnated with the matrix material 28 and are pulled through a heated die and additional curing heaters where the matrix material 28 undergoes cross linking. A person having ordinary skill in the art will understand that controlled movement and support of the pulled load carrying fibers 26 may be used to form a desired linear or curved profile of the untensioned core 24. In an exemplary embodiment, the core 24 has a cross-sectional thickness of about 0.5 millimeters to about 4 millimeters. In another embodiment, the core 24 has a cross-sectional thickness of 1 millimeter. Further, in some embodiments the core 24 has a circular cross-section, while in other embodiments the core 24 may have other cross-sectional shapes, such as rectangular or oval.

The tension member 16 further includes an outer layer 30 formed from braided or woven fibers that substantially envelops the core 24. The outer layer 30 may be applied to the core 24 by, for example wrapping around the core 24 or braiding around the core 24. The outer layer 30 is formed from fibers of, for example, carbon, glass, aramid, nylon, or polymer fibers. In some embodiments, the outer layer 30 material is the same as the core 24 material, while in other embodiments the materials may differ. Further, in other embodiments the outer layer 30 is formed from metallic wires. The braiding of the outer layer 30 orients fibers off-axis relative to the core 24 to support off-axis stresses on the tension member 16. Further, the outer layer 30 can have lower stiffness which reduces bending stresses and allows the overall tension member 16 to have a larger thickness or diameter than just an aligned fiber tension member. While in the embodiment of FIG. 2, the outer layer 30 and the core 24 are separate and distinct, in other embodiments the outer layer 30 and the core may be intermingled via, for example, the matrix material 28 flowing into the outer layer 30 during manufacturing or during post-processing to remove any sharp boundaries between the core 24 and the outer layer 30. Further, the outer layer 30 can be formed using materials to improve performance during a fire or thermal event or during other conditions.

Figure 3:
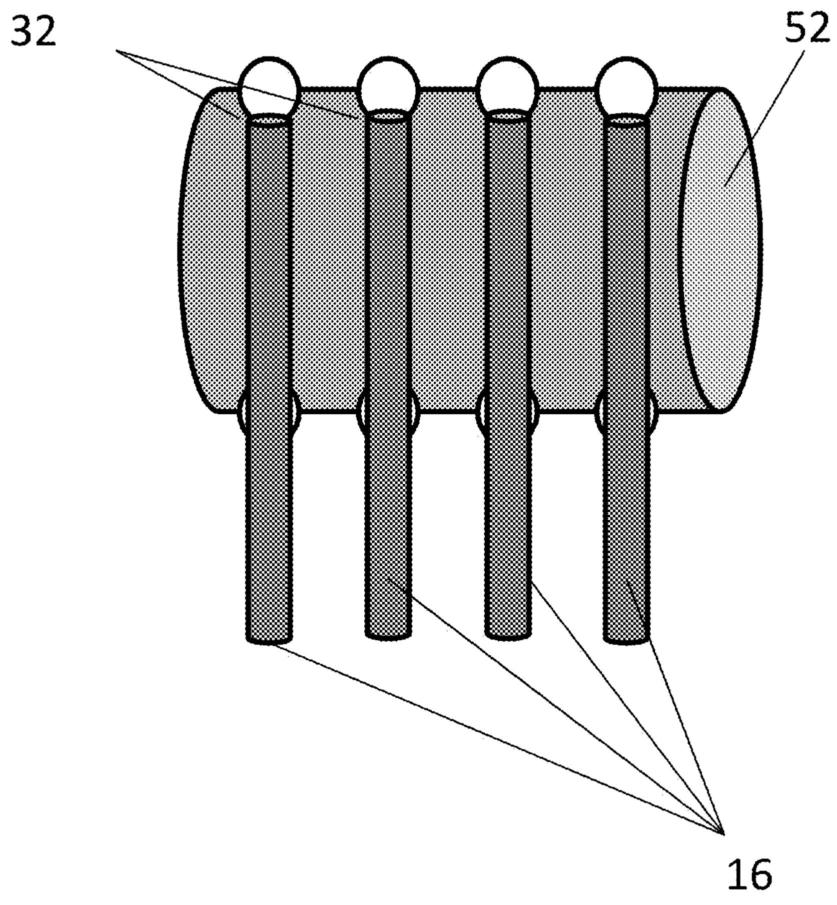
FIG. 3 is a schematic view of a plurality of tension members installed at a sheave.

Referring now to FIG. 3, in some embodiments one or more tension members 16 are utilized as cables to support and/or drive the elevator car 12. In such embodiments, the tension members 16 are routed over the traction sheave 52, which may include sheave grooves 32 to position the tension members 16 at the traction sheave 52. In some embodiments, the outer layer 30 is configured to have sufficient flexibility to conform to the sheave grooves 32.

Figure 4:
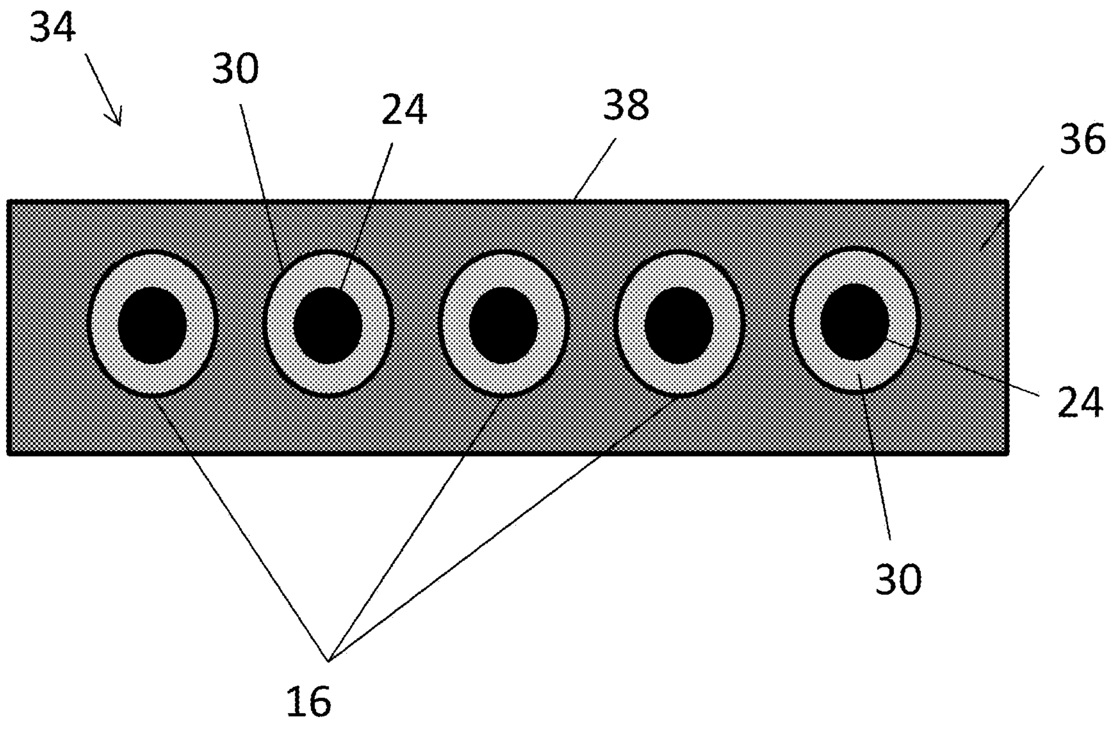
FIG. 4 is a cross-sectional view of another exemplary embodiment of a tension member.

Referring now to FIG. 4, one or more tension members 16 may be utilized in a belt 34, which suspends and/or drives the elevator car 12. The one or more tension members 16 are arranged in a jacket 36. The tension members 16 extend along a length of the belt 34, and are arranged across a lateral width of the belt 34, and in some embodiments are spaced from each other as shown in FIG. 4.

The tension members 16 are at least partially enclosed in the jacket 36, to restrain movement of the tension members 16 in the belt 34 and protect the tension members 16. In embodiments including the jacket 36 defines a traction surface 38 configured to contact a corresponding surface of the traction sheave 52. Exemplary materials for the jacket 36 include the elastomers of thermoplastic and thermosetting polyurethanes, polyamide, thermoplastic polyester elastomers, and rubber, for example. Other materials may be used to form the jacket 36 if they are adequate to meet the required functions of the belt 34. For example, a primary function of the jacket 36 is to provide a sufficient coefficient of friction between the belt 34 and the traction sheave 52 to produce a desired amount of traction therebetween. The jacket 36 should also transmit the traction loads to the tension members 16. In addition, the jacket 36 should be wear resistant and protect the tension members 16 from impact damage, exposure to environmental factors, such as chemicals, for example. One or more additive materials may be incorporated into the jacket 36 to enhance performance such as traction and environmental resistance. In embodiments with the jacket 36, the outer layer 30 with the off-axis fibers promotes improved adhesion between the tension members 16 and the jacket 36.

Figure 5:
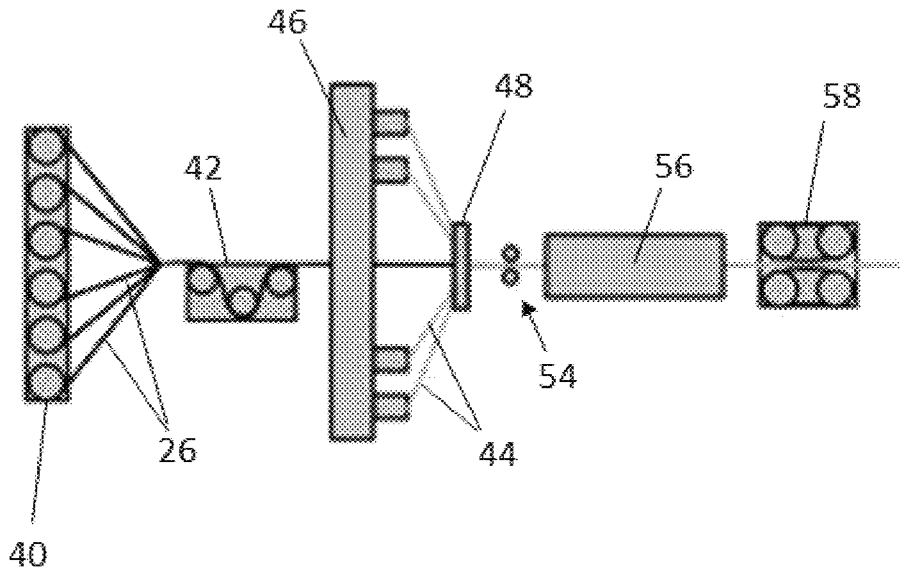
FIG. 5 is a schematic view of a process for manufacturing a tension member.

Referring now to FIG. 5, shown is a schematic view of a process for manufacturing a tension member 16, which is illustrated as a continuous manufacturing process. Load carrying fibers 26 are fed from a core reel 40, aligned or grouped, then impregnated with the matrix material 28 at an impregnation bath 42 to form the core 24. The outer layer 30 is formed over the core 24 by feeding outer yarns 44 into a braider 46 and through an impregnation ring 48 to impregnate the braided outer yarns 44 with matrix material. The braided and impregnated outer yarns 44 are positioned around the core 24 and positioned at the core 24 by passing the core 24 and the outer yarns 44 through one or more rollers 54. The assembled core 24 and outer layer 30 are then passed through an oven 56 or other curing apparatus to at least partially set the matrix material. The assembly then passes through a puller 58 to apply tension to the load carrying fibers 26 of the core 24 to their final set position. The assembly can then be cut to length and/or spooled for subsequent fabrication of the belt 34.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A belt for suspending and/or driving an elevator car, comprising:

a plurality of tension members extending along a length of the belt, each tension member including:

a core including a plurality of individual load carrying fibers arranged unidirectionally, substantially in a direction parallel to a tension member length and impregnated with a first matrix material; and an outer layer secured to the core including a plurality of outer fibers arranged around a perimeter of the core, the outer layer including one or more outer fibers arranged off-axis relative to the load carrying fibers of the core; and a jacket at least partially encapsulating the plurality of tension members to retain the plurality of tension members;

wherein the plurality of outer fibers are braided around the core to form the outer layer;

wherein the plurality of load carrying fibers comprise one or more of glass, nylon, and polymer fibers;

wherein the core has a cross-sectional thickness in the range of 0.5 millimeters to 1.0 millimeters; and wherein the plurality of outer fibers are impregnated with a second matrix material after forming of the core but prior to the plurality of outer fibers being braided around the core.

2. The belt of claim 1, wherein the plurality of tension members are arranged along a lateral width of the belt.

3. The belt of claim 1, wherein the first matrix material is intermingled with the outer layer.

* * * * *